(12) United States Patent
Schmidt-Kaeding

(10) Patent No.: US 12,055,483 B2
(45) Date of Patent: Aug. 6, 2024

(54) OPTICAL DETECTION SYSTEM FOR DETECTING A SUBSTANCE IN A MEASUREMENT REGION

(71) Applicant: Dräger Safety AG & Co. KGaA, Lübeck (DE)

(72) Inventor: Patrick Schmidt-Kaeding, Lübeck (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 449 days.

(21) Appl. No.: 17/263,747

(22) PCT Filed: Jul. 23, 2019

(86) PCT No.: PCT/EP2019/069807
§ 371 (c)(1),
(2) Date: Jan. 27, 2021

(87) PCT Pub. No.: WO2020/020891
PCT Pub. Date: Jan. 30, 2020

(65) Prior Publication Data
US 2021/0172870 A1 Jun. 10, 2021

(30) Foreign Application Priority Data
Jul. 27, 2018 (DE) .................... 10 2018 005 915.5

(51) Int. Cl.
*G01N 21/3504* (2014.01)

(52) U.S. Cl.
CPC . *G01N 21/3504* (2013.01); *G01N 2021/3513* (2013.01); *G01N 2201/0631* (2013.01)

(58) Field of Classification Search
CPC ....... G01N 21/3504; G01N 2021/3513; G01N 2201/0631
See application file for complete search history.

(56) References Cited

U.S. PATENT DOCUMENTS

| 3,807,857 A * | 4/1974 | Rubin ................ G03B 27/73 355/71 |
| 4,893,026 A | 1/1990 | De Colstoun et al. |
| 9,448,114 B2 | 9/2016 | Goldring et al. |
| 11,513,299 B2 | 11/2022 | Shields et al. |
| 2015/0233762 A1 | 8/2015 | Goldring et al. |

(Continued)

FOREIGN PATENT DOCUMENTS

| CN | 103946725 A | 7/2014 |
| CN | 104833655 A | 8/2015 |

(Continued)

*Primary Examiner* — Jamil Ahmed
(74) *Attorney, Agent, or Firm* — McGlew and Tuttle, P.C.

(57) ABSTRACT

A detection system with a two-step homogenizing device (1) and with a receiver (42). Viewed in a field direction (54) of a photon field, the homogenizing device (1) is located between a measurement area (44) and the receiver (42). The homogenizing device (1) includes a first diffuser (10) and a second diffuser (12). The first diffuser (10) generates an intermediate photon field from an input photon field. The second diffuser (12) generates an output photon field from the intermediate photon field. The receiver (42) generates signals depending on the incident photon field.

20 Claims, 5 Drawing Sheets

(56) References Cited

U.S. PATENT DOCUMENTS

2015/0292948 A1* 10/2015 Goldring .............. G01J 3/0229
356/326
2017/0292908 A1 10/2017 Wilk et al.
2018/0184890 A1* 7/2018 Stone .................... F21V 5/002

FOREIGN PATENT DOCUMENTS

| EP | 1546690 B1 | | 3/2010 | |
|----|------------|---|--------|---|
| EP | 2562520 A1 | * | 2/2013 | ................ G01J 3/02 |
| EP | 2562520 A1 | | 2/2013 | |
| GB | 201610277 | | 7/2016 | |
| WO | 2011132360 A1 | | 10/2011 | |
| WO | 2014170828 A1 | | 10/2014 | |

* cited by examiner

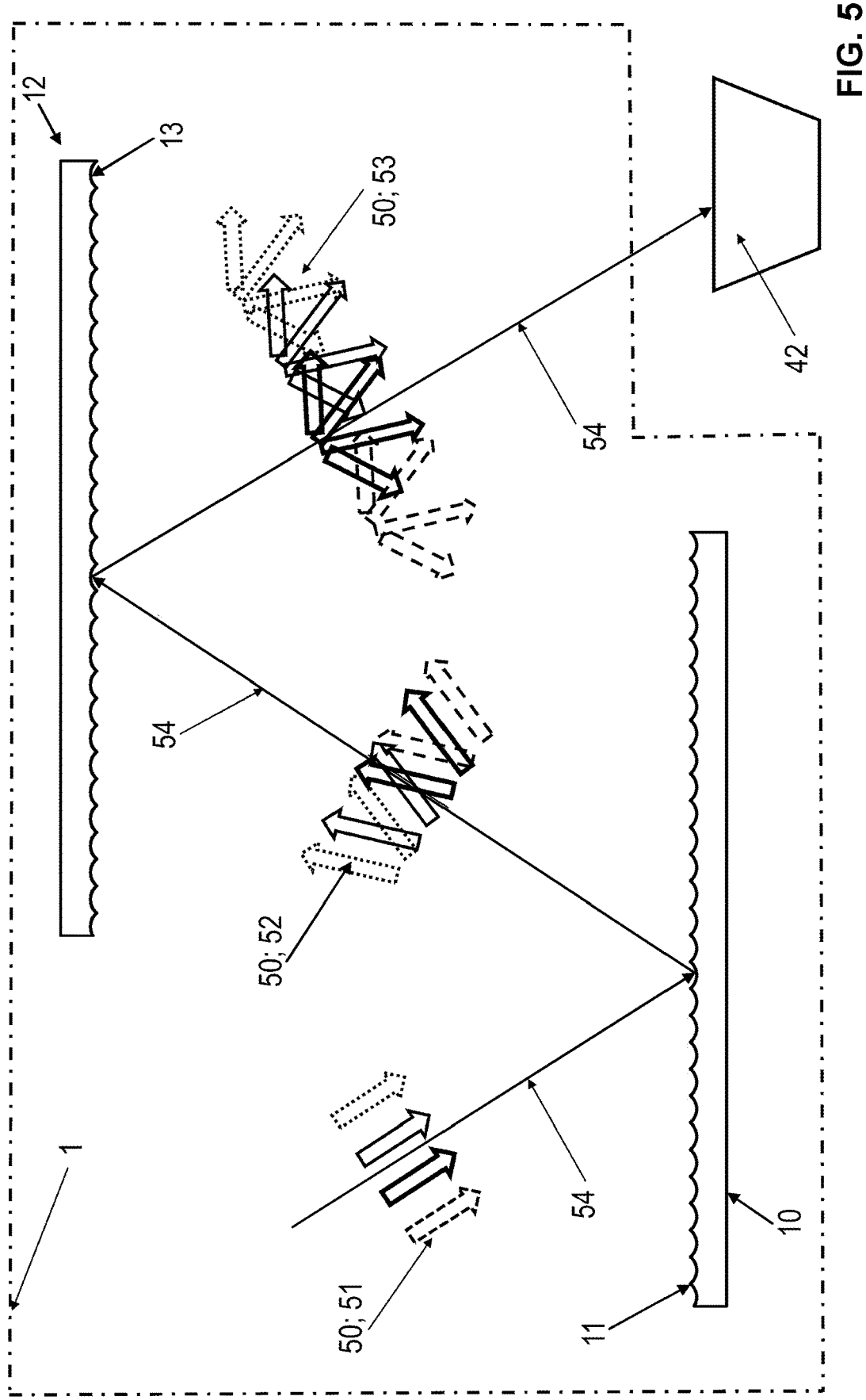

OPTICAL DETECTION SYSTEM FOR DETECTING A SUBSTANCE IN A MEASUREMENT REGION

CROSS REFERENCE TO RELATED APPLICATIONS

This application is a United States National Phase Application of International Application PCT/EP2019/069807, filed Jul. 23, 2019, and claims the benefit of priority under 35 U.S.C. § 119 of German Application 10 2018 005 915.5, filed Jul. 27, 2018, the entire contents of which are incorporated herein by reference.

TECHNICAL FIELD

The present invention pertains to a detection system, which comprises a homogenizing device and a receiver as well as optionally a transmitter for transmitting a photon field and an analysis unit. The presence of at least one defined fluid can be detected by means of such a detection system in a measurement area to be monitored. The measurement area is, e.g., in an oil production facility, a refinery or another chemical plant or along a pipeline. A correspondingly configured detection system is capable, moreover, of detecting the percentage of at least one defined substance in the fluid. The optional transmitter transmits a photon field. The transmitted photon field interacts with defined fluids. The photon field is changed by this interaction. The receiver receives the photon field changed by the interaction and generates signals, which depend on the change. The optional analysis unit analyzes these signals and is capable of prompting the outputting of corresponding messages. Such a detection system is capable, in particular, of outputting an alarm when a defined fluid, for example, a toxic or explosive gas, was detected in the measurement area or the concentration is above a threshold value.

TECHNICAL BACKGROUND

Different detection systems with diffusers and/or homogenizers for photon fields have become known.

WO 2014/170828 A1 shows a device 1 for spectroscopy by means of SCAR (saturated absorption cavity ring-down spectroscopy). A light source 2 generates laser light with continuous waves and variable frequency. A cylindrical housing 3 with two mirrors 4a and 4b takes up the gas to be tested through an inlet 5. A photodetector 7 measures the radiation, which exits from the housing. A diffuser 8, which scatters the exiting laser light, is arranged between the rear mirror 4b and the photodetector 7. Two preamplifiers 12 and 13 amplify the signals from the photodetector 7, and a processor 14 analyzes the amplified signals.

US 2017/0292908 A1 describes a hand-held device for testing foods, cf. FIG. 1. A light source (illumination module 140) emits light in the visible or invisible range to an object to be tested (sample S). A spectrometer 160 measures the reflected light. The light source 140 comprises a diffusion device (radiation diffusion unit 213), cf. FIG. 12. Viewed in the emission direction, this diffusion device 213 comprises a plurality of LEDs 210, a cover glass 230, a first diffuser 215, a convex lens 225, a second diffuser 220 and an additional cover glass 230. The space between the convex lens 225 and the second diffuser 220 is defined by two light-absorbing side walls.

EP 1546690 B1 describes a device for the contactless testing of an elongated web of a product, for example, a paper web 90. The paper web 90 is pulled through a gap, which is defined by a light source 22 with a first homogenizer (light source homogenizer 50) on one side and by a second homogenizer (detector light homogenizer 62) on the other side. Both homogenizers 50, 62 have a hemispherical surface each, which reflects light beams in different directions, cf. FIG. 2a.

SUMMARY

A basic object of the present invention is to provide a detection system, which has a higher reliability than prior-art detection systems. The object is accomplished by a detection system having the features according to the invention. The detection system is capable of detecting a substance in a measurement area. A photon field is emitted from this measurement area in a field direction.

The detection system comprises a receiver-side homogenizing device with a first diffuser and with a second diffuser as well as a receiver. Viewed in the field direction, the first diffuser is arranged downstream of the measurement area and the second diffuser is arranged downstream of the first diffuser. Viewed in the field direction, the second diffuser is arranged with a diffuser distance downstream of the first diffuser. The receiver is arranged downstream of the second diffuser. The entire homogenizing devices—or at least a part with the two diffusers—is thus arranged between the measurement area and the receiver.

At least one part of the photon field, which exits from the measurement area in the flow direction, passes through both diffusers and reaches the receiver. The first diffuser is capable of homogenizing an input photon field, which reaches an input area of the homogenizing device, which input area points towards the measurement area, and/or the first diffuser and of generating an intermediate photon field thereby. The second diffuser is capable of further homogenizing the intermediate photon field and thereby of generating an output photon field. This output photon field propagates in the field direction to the receiver.

The "field direction" of the photon field is defined as the propagation direction in which the largest part of the intensity of the photon field propagates. The photon field passes completely or at least partially through the homogenizing device at least in this field direction and/or is reflected by same. This field direction may change over the path of the photon field from a transmitter to the receiver at least once, especially due to reflection, e.g., at a diffuser or at a wall of the homogenizing device.

The "homogeneity" of a photon field is an indicator of how strongly the intensity of the photon field varies in space, i.e., of how strongly the intensity depends on the particular location in the photon field. The intensity is equal over the entire extension of the photon field in an ideally homogeneous photon field. Examples of inhomogeneous photon fields, i.e., fields with an intensity varying greatly from one location to the next, are the photon field of a strongly collimated and/or strongly focused light bundle as well as the photon field of a laser transmitter. An ambient and undirected illumination generates, as a rule, a photon field with high homogeneity.

A homogenizing device is capable of increasing the homogeneity of a photon field. High homogeneity is advantageous especially for the following reasons: The signals, which reach the receiver, shall only depend to the greatest possible extent on the substances to be detected and shall be compromised by interfering effects as little as possible. Furthermore, the receiver shall ideally generate a constant and reproducible signal. In order to reach this goal, it is necessary, as a rule, to position the receiver in a defined position relative to the measurement area and/or relative to a transmitter. The actual relative position of the receiver may not deviate from the predefined desired position by more than a tolerance. As a rule, this tolerance increases with increasing homogeneity of the photon field reaching the receiver. Consequently, a higher homogeneity leads to a higher error tolerance in positioning the receiver. The number of unrecognized hazardous situations and/or false alarms is reduced compared to a lower homogeneity.

At least a part of the photon field emitted by a transmitter or generated in another manner passes at first through the measurement area and then through the homogenizing device and reaches the receiver after homogenization. The homogenizing device consequently homogenizes the photon field, which has already passed through the measurement area. The photon field, which reaches the receiver, is homogenized therefore more strongly than it would be if the homogenizing device were positioned upstream of the measurement area. In case of a homogenizing device located upstream of the measurement area, a fluid in the measurement area could again reduce the homogeneity of the photon field and thus partially abolish the above-mentioned advantage of a homogenizing device again.

According to the present invention, the homogenizing device comprises a first diffuser and a second diffuser, between which a diffuser distance is present. Viewed in the field direction, at least a part of the emitted photon field passes at first through the measurement area, then through a first diffuser, then through the diffuser distance and then through the second diffuser and it subsequently reaches the receiver. The first diffuser generates from the input photon field an intermediate photon field. The second diffuser generates from the intermediate photon field the output photon field. The photon field is consequently homogenized by at a homogenizing device operated in at least two steps rather than in only one single step. The intermediate photon field has, as a rule, a higher homogeneity than the input photon field, i.e., it has a lower location dependence of the intensity, and the output photon field has a higher homogeneity than does the intermediate photon field. The output photon field generated in this manner in two steps is homogenized, as a rule, markedly better than in case of a one-step device. In particular, the intensity of the output photon field is, as a rule, distributed more homogeneously over the plane in a plane that is at right angles to the field direction than it is in case of a one-step device. On the one hand, the higher homogeneity of the photon field reaching the receiver increases the error tolerance in positioning the receiver, which was already described above. The higher homogeneity and/or the resulting higher error tolerance reduce in many cases the number of false alarms or other incorrect detection compared to a one-step homogenizing device.

In order for the receiver to be able to generate sufficiently reliable signals and for an optional analysis unit to be able to analyze these signals with sufficient reliability, it is, further, necessary for the output photon field to reach the receiver with a sufficiently high intensity. A conceivable possibility of guaranteeing this is to ensure that a transmitter transmits the photon field with a sufficiently high transmission power. However, the transmission power is limited precisely in potentially explosive areas, for example, in oil production facilities, in order to rule out with certainty the possibility that the transmitter could trigger an explosion or a fire. Therefore, the desired homogenization cannot be achieved in many applications with a one-step homogenizing device. By contrast, it is possible in many cases thanks to the present invention especially in connection with an application in potentially explosive areas to achieve the desired effect, despite the boundary conditions, that the homogenizing device according to the present invention leads to a lower loss of intensity than do other detection systems.

As was already described, an intermediate space is formed according to the present invention between the first diffuser and the second diffuser based on the diffuser distance. The intermediate photon field generated by the first diffuser can propagate in the space between the two diffusers. It is made possible in many cases that areas of different intensities of the photon field will be mixed in this intermediate space. The output photon field has a higher homogeneity especially because of the intermediate space between the two diffusers than if the two diffusers would adjoin each other without a distance or if a homogenizing device with only one single diffuser were used. Especially because of the mixing, which is achieved in this intermediate space in many cases, the same increase in homogenization is achieved with a lower absorption, reflection and/or reduction of the intensity compared to a configuration in which the homogenizing device has only a single diffuser or two diffusers directly adjoining one another.

A homogenizing device inevitably absorbs a part of the incident photon field, i.e., it reduces the intensity or the power of this photon field. A one-step homogenizing device, which brings about the same homogenization as a two-step homogenizing device, has no such intermediate space and reduces, as a rule, the intensity more strongly and/or requires a higher transmission power. This reduction of the intensity and this higher transmission power are, as a rule, undesired.

The present invention makes it possible to position and to orient the first diffuser and/or the second diffuser such that they are arranged at the location of the respective highest intensity of the particular photon field (input photon field or intermediate photon field). This configuration increases the intensity with which the photon field reaches the receiver compared to other conceivable positioning, without the transmission power having to be increased. Since two diffusers are positioned at spaced locations from one another, the present invention offers an additional degree of freedom when configuring a detection system according to the present invention, namely, the position of one diffuser relative to the other diffuser.

In one embodiment, the position of the homogenizing device relative to the receiver cannot be changed. As a result, the arrangement of the homogenizing device and of the receiver at the time of construction essentially determines the homogenization with which the photon field reaches the receiver. A possible source of error, which results from an incorrect or unintended variation of the positioning of the homogenizing device relative to the receiver, is ruled out by this embodiment. It is ensured in many cases that the two-step homogenizing device also achieves the same homogenizing effect.

A diffuser distance is formed according to the present invention between the first diffuser and the second diffuser. As a result, an intermediate space, in which the intermediate photon field can be mixed, is formed between the two diffusers. This intermediate space is defined in one embodiment by the two diffusers as well as by a jacket surface. The jacket surface prevents the entry of interfering external radiation into the intermediate space and/or the exit of the transmitted photon field from the intermediate space, which would reduce the intensity. The jacket surface may be configured as an individual, contiguous surface or it may also be composed of a plurality of individual surface elements.

The intermediate photon field is capable of passing through the intermediate space without being scattered diffusely in the intermediate space. In particular, no additional diffuser is preferably arranged in this intermediate space. This configuration leads to an especially small reduction of the intensity in the intermediate space, especially because the photon field is not absorbed nor reflected substantially.

In one embodiment, the jacket surface, which defines the intermediate space, is configured as a mirror or comprises at least one mirror. The mirror or each mirror points towards the intermediate space and reflects an incident photon field completely or at least partially. The configuration with the mirror has especially the following advantage: Without a mirror, a relevant part of the photon field could pass through the jacket surface and it would not as a result reach the second diffuser and therefore it would not, as a rule, reach the receiver, either. As a result, the intensity of the photon field reaching the receiver would be reduced, which could also reduce the recognition rate of the detection system. The mirror or each mirror does, by contrast, reflect the incident photons back into the intermediate space and it prevents these photons from leaving the intermediate space. The angle of incidence is known to be ideally equal to the angle of reflection of the field direction, so that the mirror or each mirror can be arranged such that it directs the incident photon field to the second diffuser.

In one embodiment, at least one of the diffusers is configured as a volume diffuser. The first diffuser is preferably a volume diffuser, and the volume diffuser is preferably a facet diffuser. A volume diffuser increases the homogenization of a photon field, which passes through the volume diffuser, over the entire path from the input side to the output side of the volume diffuser. As a result, the homogenization effect is often stronger at equal thickness and therefore equal reduction of the intensity than in other embodiments of a diffuser.

At least one of the two diffusers, preferably the second diffuser, is configured as a surface diffuser in one embodiment. This surface diffuser especially preferably has a roughened surface. Such a surface diffuser frequently reduces the output or the intensity of an incident photon field less than do other possible embodiments of a diffuser.

It is possible that the first diffuser and/or the second diffuser are configured to reflect the photon field diffusely. "Diffuse reflection" means that the diffuser scatters the photon field during the reflection and thereby homogenizes it. The field direction of the photon field changes depending on the reflection, as a rule, such that an angle of incidence of the field direction with respect to the reflecting diffuser is equal to an angle of reflection of the field direction. The diffusely reflecting diffuser preferably has a correspondingly structured surface. This surface preferably brings about the desired diffuse reflection. For example, an intrinsically reflecting surface, for example, a metal layer, is roughened during the manufacture of the diffuser in order to bring about the diffuse reflection. Since the diffuser changes the field direction of the photon field, a detection system with such a diffuser can be better adapted in some cases to the predefined conditions of a measurement area than other detection systems.

In one embodiment, the first diffuser and/or the second diffuser are configured as a transmitting diffuser. A photon field passes through a transmitting diffuser, ideally without its field direction changing. A plurality of scattering centers are preferably distributed over a transmitting diffuser. The photon field is scattered diffusely as a result during its passage through the diffuser. As an alternative or in addition to the scattering center, a surface of the diffuser may be configured to diffusely transmit the photon field, for example, by a roughened and/or sand-blasted surface. It is possible that only the surface will scatter the photon field actively diffusely and the rest of the diffuser transmits the photon field essentially unchanged and is, for example, completely transparent to the photon field. For example, a diffusely transmitting surface is applied to an otherwise transparent support consisting of, e.g., glass or transparent plastic. It is also possible that only an area of a diffuser has scattering centers and the rest of this diffuser has a transparent configuration.

In one embodiment, the homogenizing device additionally comprises an optical element, which is optically transparent to the photon field, exerts no diffusely scattering effect on the photon field and is configured, for example, as a convex lens. This optical element may be located at a spaced location from both diffusers, which leads in some cases to an additional increase in the homogenizing effect. In an alternative embodiment, one of the two diffusers, preferably the first diffuser, is arranged at this optical element or forms a component of this optical element. This configuration saves space because the dimension is reduced in the field direction compared to a configuration in which a distance each is present between the optical element and each diffuser.

A diffuser distance is formed according to the present invention between the first diffuser and the second diffuser. Seen in the field direction, this diffuser distance is preferably between 1 mm and 30 mm and especially between 2 mm and 20 mm. The diffuser distance is 10 mm in one embodiment.

According to the present invention, the photon field reaches the receiver after passing through the measurement area and after the homogenization carried out in two steps. In one embodiment, a distance, namely, a receiver distance, likewise develops between the homogenizing device and the receiver when viewed in the field direction. The receiver distance is defined as the shortest geometric path over which a photon can travel from the second diffuser to the receiving surface of the receiver. The receiver distance is the distance between the homogenizing device and the receiver. This receiver distance is preferably between 1 mm and 30 mm and especially preferably between 2 mm and 20 mm when viewed in the field direction. The receiver distance is 10 mm in one embodiment.

In one embodiment, the homogenizing device comprises a third diffuser, which is arranged downstream of the first diffuser and upstream of the second diffuser or also upstream of the first diffuser or downstream of the second diffuser. The first diffuser generates a first intermediate photon field from the input photon field. The third diffuser between the first and second diffusers generates a second intermediate photon field from the first intermediate photon field. The second diffuser generates the output photon field from the second intermediate photon field. Or else, the second diffuser generates a second intermediate photon field, and the third diffuser generates the output photon field from the second intermediate photon field. The third diffuser leads to an even greater homogenization of the photon field in some applications.

It is possible that the photon field is generated and emitted by at least one source not belonging to the detection system. In one embodiment, the detection system further comprises, by contrast, a transmitter. This transmitter is capable of transmitting a photon field into the measurement area. The transmitter operates such that at least a part of the transmitted photon field passes through the measurement area and the homogenizing device and falls on the receiver. The transmitter makes it easier to generate a reproducible photon field.

In one embodiment, the position of the homogenizing device can be changed relative to the transmitter and, in particular, the distance—viewed in the field direction—between the homogenizing device and the transmitter can be changed. This embodiment makes it easier to adapt the detection system according to the present invention to the dimensions and other conditions and boundary conditions of a predefined measurement area. This adaptation would be more difficult, and in many cases even impossible, if the transmitter and the homogenizing device were arranged unchangeably in relation to one another.

The distance can preferably be at least doubled or halved. There preferably is no mechanical connection between the transmitter and the receiver. Such a mechanical connection reduces in some cases the possibility of using the detection system. The distance between the homogenizing device and the transmitter can especially be changed between a predefined minimum distance and a predefined maximum distance. The minimum distance equals, for example, 1 m, 2 m or 4 m. At a distance above the minimum distance, the homogenizing device achieves sufficient homogenization of the transmitted photon field. The maximum distance is, for example, 100 m, 200 m or 400 m. Up to this maximum distance, the transmitter is still capable of transmitting the photon field with a sufficient power and intensity, and predefined requirements on the avoidance of hazards, especially on the avoidance of an explosion hazard, are still met. The transmitter, the homogenizing device and the receiver are in one line in one embodiment. The field direction preferably extends along this line. This embodiment often leads to an especially small reduction of the photon field intensity between the transmitter and the receiver. In another embodiment, the field direction is not a line, but is bent or curved, for example, because the photon field is reflected at least once on its way from the transmitter to the receiver. Such a reflection makes it easier in some applications to adapt the detection system to the conditions of a predefined measurement area.

In a preferred embodiment, the detection system comprises an analysis unit. The photon field, which has passed through the measurement area and was homogenized by the homogenizing device, falls according to the present invention completely or at least partly on the receiver. Depending on the incident photon field, the receiver generates signals. These signals are transmitted to the optional analysis unit. The optional analysis unit analyzes these signals automatically. By analyzing the received signals, the analysis unit preferably checks whether at least one defined substance is present in the measurement area and/or what concentration or what percentage the substance or the at least one substance has in the fluid mixture in the measurement area. This substance may be especially gaseous or liquid or in the form of a powder. The analysis unit preferably triggers an alarm when the analysis of the signals meets a predefined criterion, i.e., a criterion concerning the presence or the concentration of a defined substance in the measurement area.

In one embodiment, the homogenizing device and the receiver are located in the receiver-side housing. The analysis unit is arranged remotely in space from the receiver-side housing, for example, in a secured area, which is not hazardous for a person. It is also possible that an output unit outputs the signals received from the receiver in a form perceptible by a person. The output unit is actuated, e.g., by the analysis unit or directly by the receiver. In one embodiment, the detection system comprises at least two receivers, which are arranged at spaced locations from one another. At least one part each of the homogenized photon field falls on each receiver. A homogenizing device according to the present invention is assigned downstream of the measurement area to at least one receiver and preferably to each receiver.

In one embodiment, the detection system comprises an additional homogenizing device, namely, a transmitter-side homogenizing device, which is located downstream of an optional transmitter or other source for a photon field and upstream of the measurement area. This transmitter-side homogenizing device homogenizes the photon field, which the transmitter transmits. This transmitter-side homogenizing device makes it possible to use a transmitter that transmits a photon field with a relatively low homogeneity and transmits, e.g., at least one laser beam. If the transmitter-side homogenizing device is arranged outside the measurement area, it can be accepted that this transmitter-side homogenizing device reduces the intensity of the transmitted photon field more strongly than does the receiver-side homogenizing device according to the present invention downstream of the measurement area, which homogenizing device comprises two diffusers, since this greater intensity reduction can be compensated by a higher transmission power of the transmitter, without causing a hazard in the measurement area. The transmitter-side homogenizing device may comprise only a single diffuser, which saves space, or likewise two diffusers.

The present invention will be explained below on the basis of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a schematic view showing a fourth embodiment of the homogenizing device according to the present invention with two diffusely reflecting diffusers.

DESCRIPTION OF PREFERRED EMBODIMENTS

Figure 1:
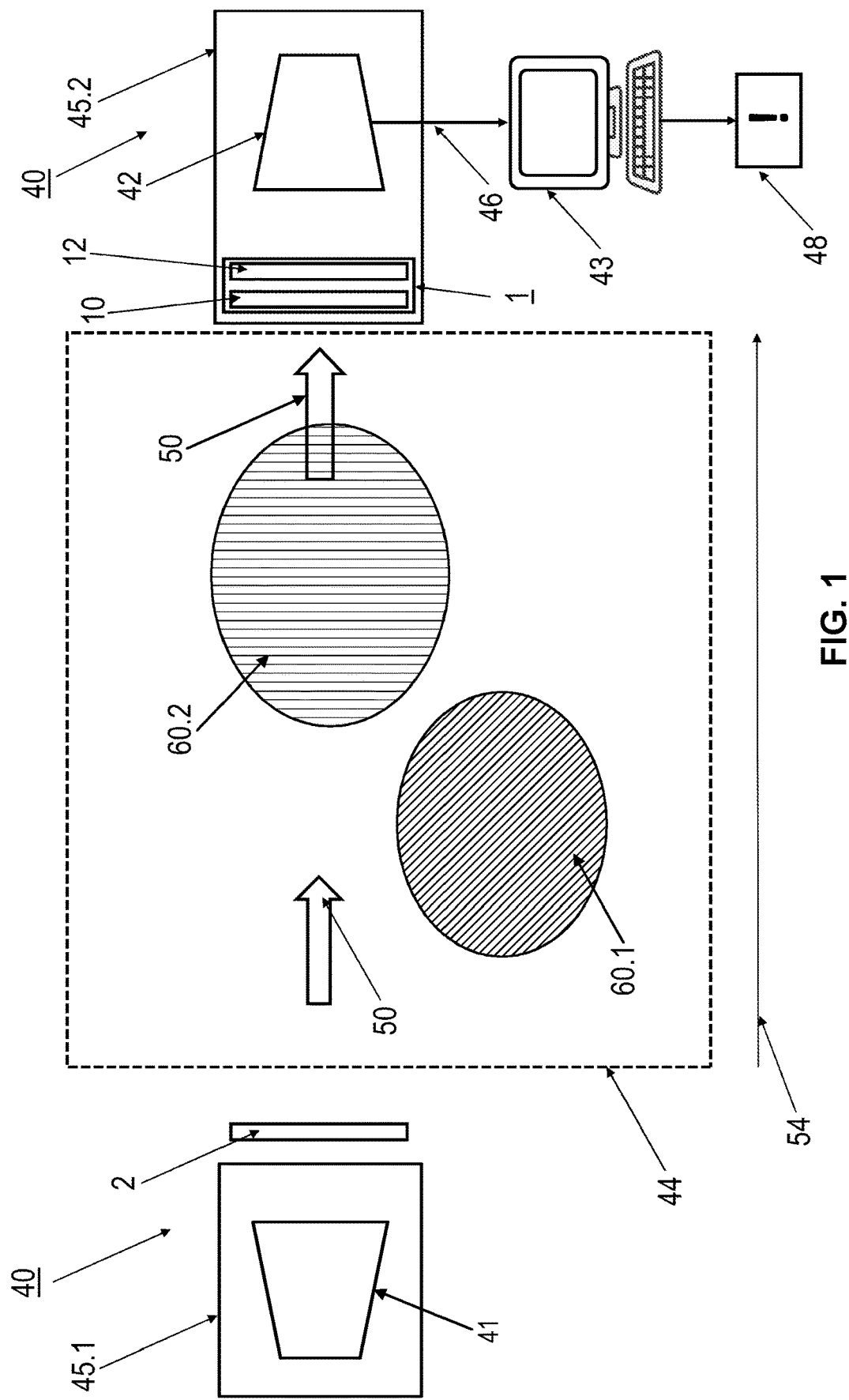
FIG. 1 is a schematic view showing the gas detection system according to the present invention according to the exemplary embodiment.

Referring to the drawings, the detection system according to the present invention is used in the exemplary embodiment to detect the presence of a gas cloud containing at least one predefined substance. "Predefined" means that it is predefined what substances the detection system shall test for in the measurement area. If a gas cloud containing such a substance was detected, the detection system triggers an alarm. In one embodiment, the detection system additionally determines what components are contained in the gas cloud and it optionally determines the respective percentage or the concentration of different substances in the gas cloud. For example, the detection system is used in a refinery or other chemical reactor or at a pipeline or in a port or airport or at a gas station in order to detect the discharge of an explosive or toxic substance in time in order to make it possible to take corresponding countermeasures in time.

FIG. 1 schematically shows the detection system 40 of the exemplary embodiment. A measurement area 44 is to be tested. For example, two different gas clouds 60.1 and 60.2 are shown as an example in the measurement area 44. The detection system of the exemplary embodiment comprises the following components:
- a transmitter 41 in a transmitter-side housing 45.1,
- a receiver-side homogenizing device 1 with a first diffuser 10 and with a second diffuser 12,
- a receiver 42,
- a receiver-side housing 45.2, which accommodates the homogenizing device 1 and the receiver 42,
- a data-processing analysis unit 43, which is arranged at a spaced location in space from the receiver-side housing 45.2,
- a data connection 46, via which signals can be transmitted from the receiver 42 to the analysis unit 43, as well as
- an output unit 48, which is actuated by the analysis unit 43 and is capable of outputting alarms in a form perceptible by persons.

The transmitter 41 transmits a photon field 50 into the measurement area 44. A transmitter-side homogenizing device 2, which homogenizes the transmitted photon field 50 before it reaches the measurement area 44, is optionally arranged between the transmitter 41 and the measurement area 44. When speaking of "the homogenizing device" below, it is defined as the receiver-side homogenizing device 1.

At least a part of the photon field 50 transmitted by the transmitter 41 passes through the measurement area 44 in a field direction 54 and falls on the homogenizing device 1. The homogenizing device 1 homogenizes the incident part of the photon field 50. The homogenized photon field 50 reaches the receiver 42. Depending on the properties of the incident photon field 50, the receiver 42 generates signals at least at times. These signals 42 are transmitted via the data connection 46 to the analysis unit 43. The analysis unit 43 automatically analyzes the received signals and checks whether or not at least one predefined substance, i.e., a substance whose presence is to be checked, is present in a gas cloud 60.1, 60.2. It optionally determines the composition of a gas cloud 60.1, 60.2 and/or the percentage or the concentration of at least one substance in this gas cloud 60.1, 60.2. If the selected result meets a predefined criterion, the analysis unit 43 triggers an alarm on the output unit 48.

FIG. 2 through FIG. 5 show four different embodiments of the two-step homogenizing device 1. Shown are the first diffuser 10, the second diffuser 12, the field direction 54 as well as the receiver 42. The first diffuser 10 homogenizes in each embodiment an incident input photon field 51 and generates an intermediate photon field 52, which has a higher level of homogenization than does the input photon field 51. The second diffuser 12 homogenizes the incident intermediate photon field 52 and generates an output photon field 53, which has a higher level of homogenization than does the intermediate photon field 52. Different intensities are indicated by different arrows in different areas of the photon field 50.

In the embodiments shown, the photon field 50 reaches the first diffuser 10 after passing through the measurement area 44 and thus it acts as the input photon field 51. The output photon field 53 homogenized in two steps falls on the receiver 42. It is also possible that an additional component, which changes the photon field 50, is arranged between the measurement area 44 and the first diffuser 10 and/or between the second diffuser 12 and the receiver 42.

Figure 2:
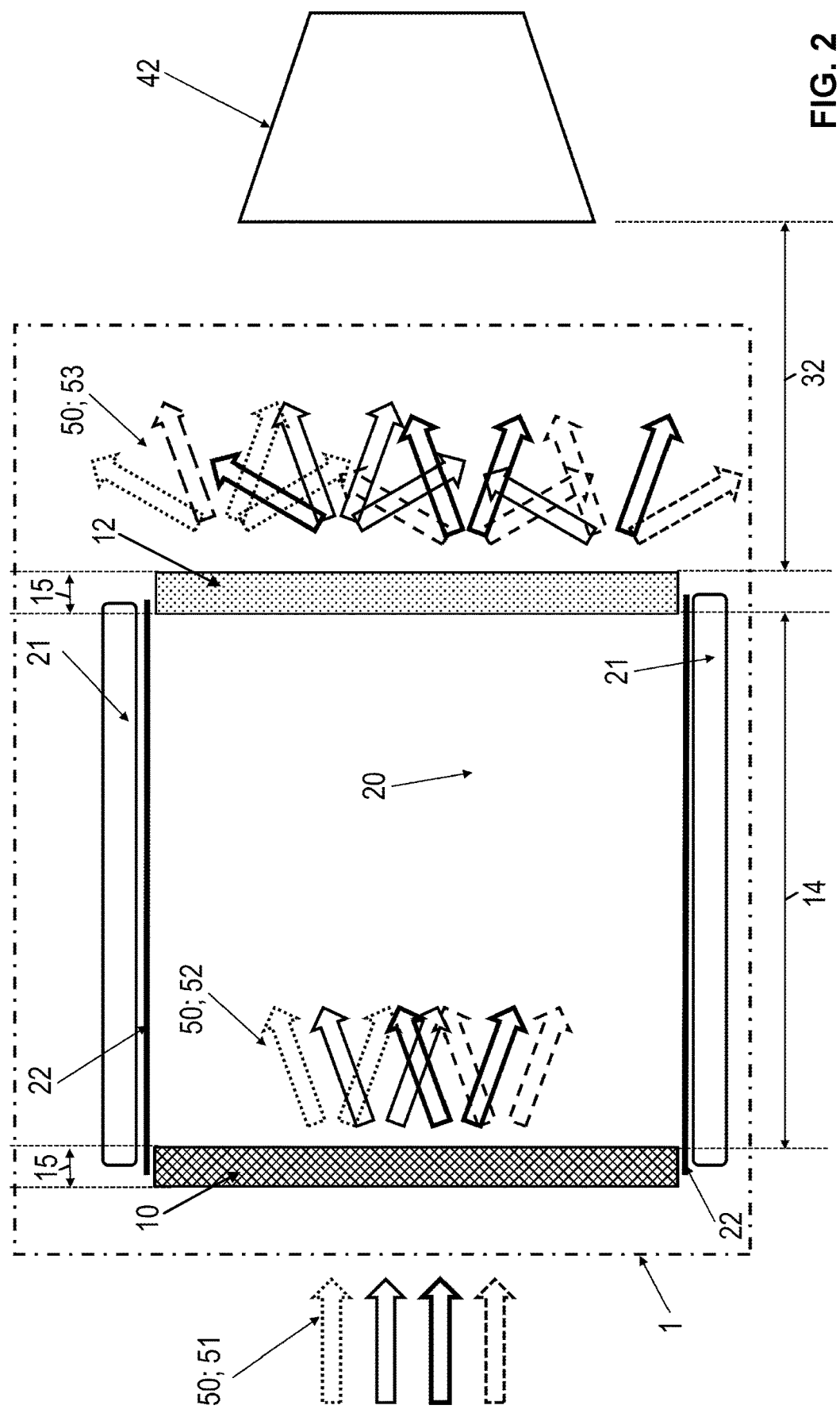
FIG. 2 is a schematic view showing a first embodiment of the homogenizing device according to the present invention with a cylindrical or cuboid intermediate space.

Further, FIG. 2 shows the thickness 15 of the first diffuser 10. The first diffuser 10 has a uniform thickness 15 over its entire extension in the first embodiment according to FIG. 2. The second diffuser 12 likewise has this thickness 15 over its entire extension. The thickness 15 is as great as needed in order to achieve a desired homogenizing effect and to obtain a mechanically sufficiently stable diffuser, and, on the other hand, it is as small as possible in order for the lowest possible percentage of the incident photon field 50 to be absorbed or reflected. In the first embodiment according to FIG. 2, both diffusers 10 and 12 are configured as a volume diffuser each, for example, as a faceted lens. The two diffusers 10 and 12 may also be configured as surface diffusers.

FIG. 2 shows, furthermore, a diffuser distance 14 between the first diffuser 10 and the second diffuser 12. This distance is between 1 mm and 30 mm and equals especially preferably about 10 mm in the exemplary embodiment. Furthermore, a receiver distance 32 between the second diffuser 12 and the receiver 42 is shown. This receiver distance 32 is between 1 mm and 30 mm and equals especially preferably likewise about 10 mm in the exemplary embodiment. The receiver distance 32 is preferably a multiple, preferably at least five times, and especially preferably at least 10 times the thickness 15 of the second diffuser 12. The first diffuser 10, the second diffuser 12 as well as a jacket surface 21 enclose in the embodiments shown a preferably completely closed and preferably air-filled intermediate space 20. The intermediate photon field 52 passes through this intermediate space 20 in the field direction 54. This intermediate space 20 has the shape of a cylinder or of a cuboid in the first embodiment according to FIG. 2 and in the third embodiment according to FIG. 4 and it has the shape of a truncated cone in the second embodiment according to FIG. 3. At least one mirror 22 or a reflecting surface, which reflects incident photons, is applied to the wall of the jacket surface 21 that points towards the intermediate space 20 in the embodiments shown, so that these photons remain in the intermediate space and do not leave the intermediate space 20 through the jacket surface 21.

Both diffusers 10 and 12 are configured as transmitting diffusers, which diffusely transmit the photon field 50, in the first three embodiments. The field direction 54 of the photon field does not change during the passage through the diffuser.

Figure 3:
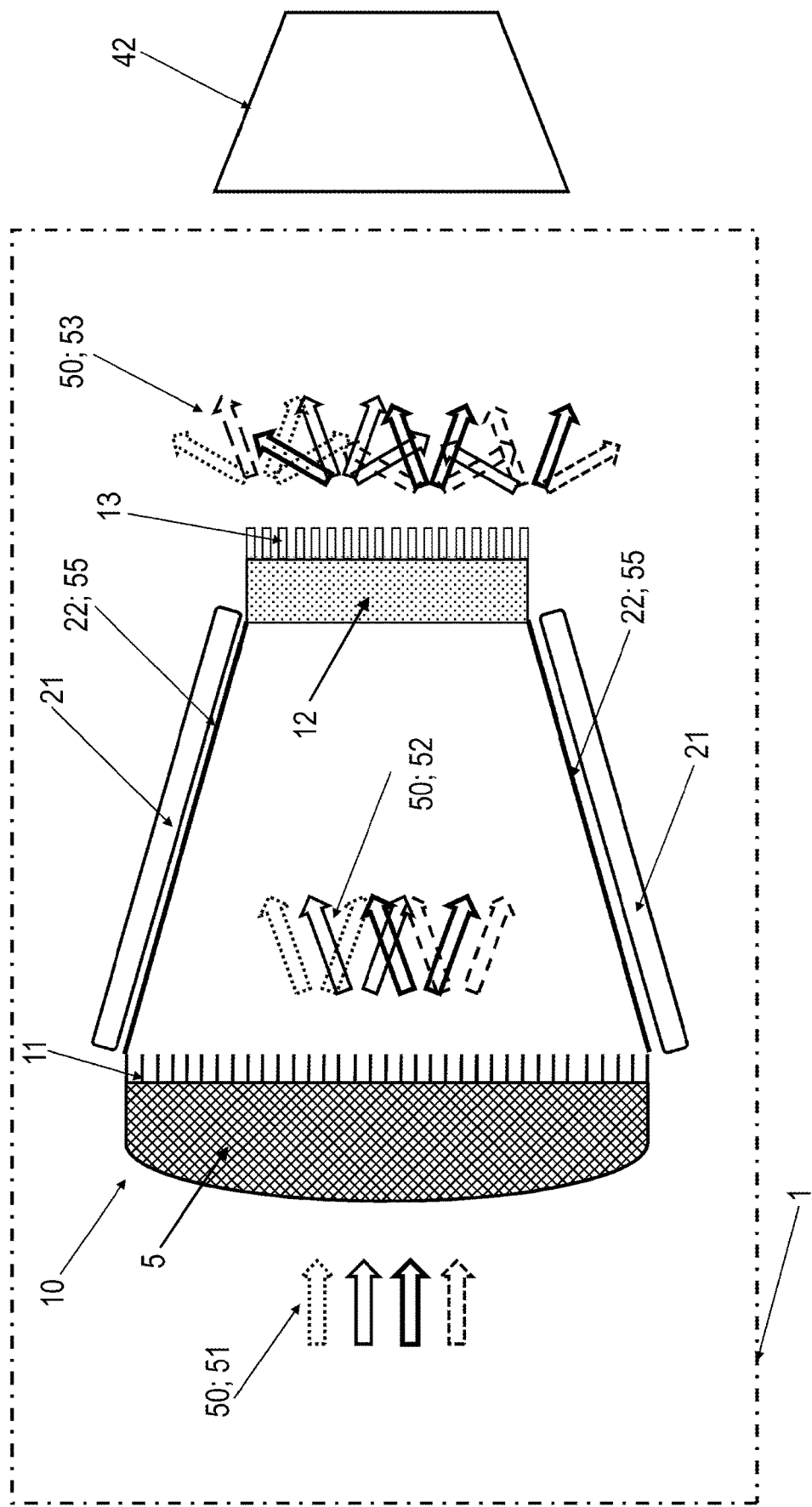
FIG. 3 is a schematic view showing a second embodiment of the homogenizing device according to the present invention with the first diffuser at a convex lens as well as an intermediate space in the form of a truncated cone.
Figure 4:
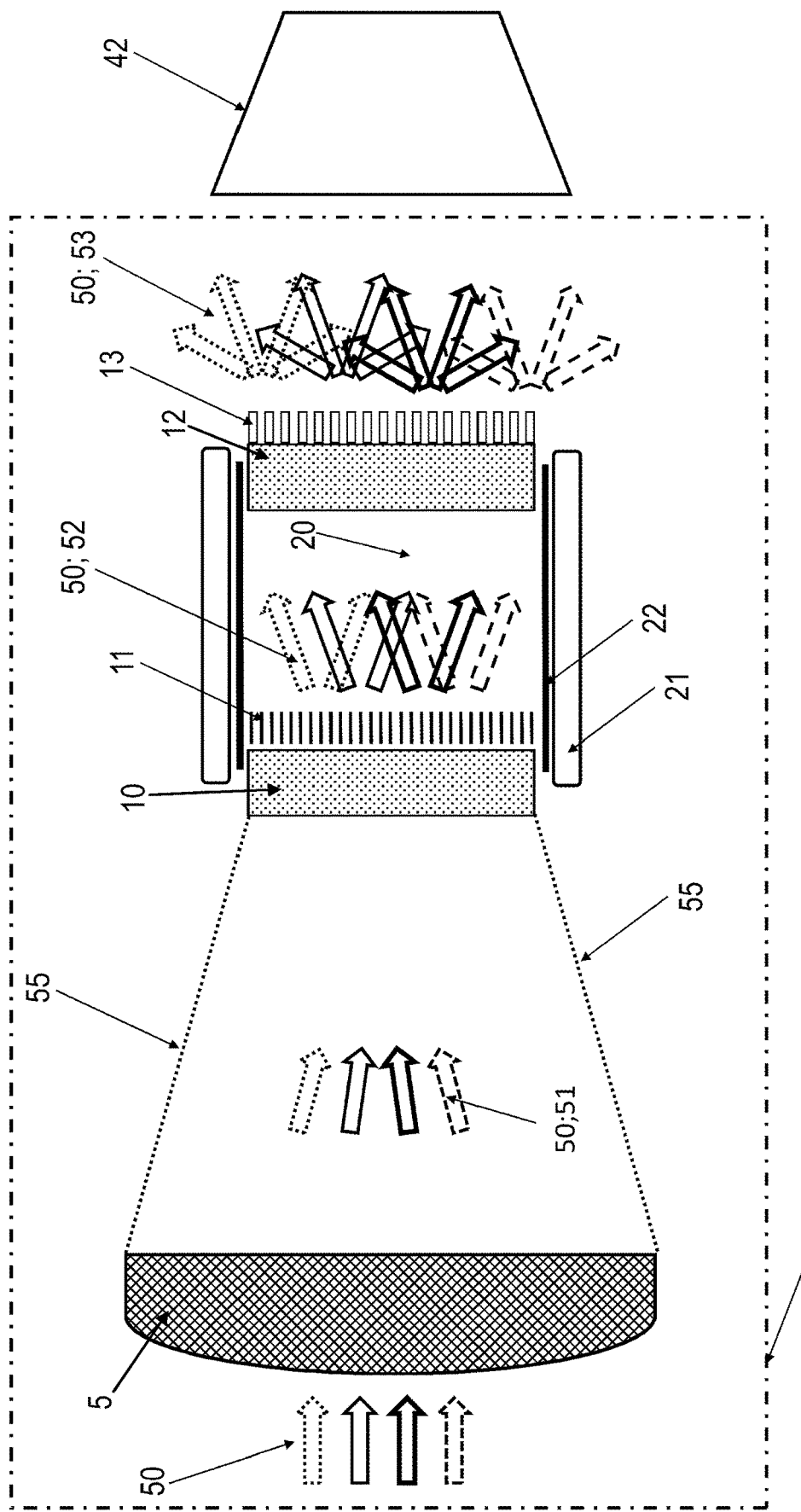
FIG. 4 is a schematic view showing a third embodiment of the homogenizing device according to the present invention with a convex lens located at a spaced location from the first diffuser and with a cylindrical or cuboid intermediate space.

In the second embodiment according to FIG. 3 as well as in the third embodiment according to FIG. 4, an optical element 5 in the form of a focusing convex lens bundles the incident input photon field 51. The convex lens 6 increases the intensity per unit area of the photon field 50 and is arranged preferably between the measurement area 44 and the first diffuser 10. The focus cone 55, which the convex lens 6 brings about, is shown. Both the first diffuser 10 and the second diffuser 12 are configured each as a surface diffuser in the second embodiment and in the third embodiment alike. In the second embodiment according to FIG. 3, the first diffuser 10 forms a part of the optical element 5. The surface 11 of the first diffuser 10, which surface points towards the intermediate space 20, brings about the homogenization of the input photon field 51. The intermediate photon field 52 generated by the homogenization is consequently focused, i.e., it preferably has a higher intensity per unit volume, and, in addition, a higher homogeneity than does the input photon field 51. The surface 13 of the second diffuser 12, which surface points towards the receiver 42, causes the intermediate photon field 52 to be homogenized.

A distance is formed between the optical element 5 and the first diffuser 10 in the third embodiment according to FIG. 4. The input photon field 51, which falls on the first diffuser 10, is already focused compared to the photon field 50 that falls on the homogenizing device 1.

Both diffusers 10 and 12 are configured as volume diffusers in the first embodiment according to FIG. 2 and as surface diffusers in the second and third embodiments according to FIG. 3 and FIG. 4, respectively. It is also possible that the first diffuser 10 is configured as a volume diffuser and the second diffuser 12 as a surface diffuser or conversely.

Both diffusers 10 and 12 are configured in the fourth embodiment according to FIG. 5 to diffusely reflect an incident photon field 50 and to homogenize it in the process. As can be seen, the field direction 54 changes its direction twice due to the two reflections at the two diffusers 10 and 12, doing so according to the known principle "angle of incidence equal to angle of reflection." Both diffusers 10 and 12 are configured again as surface diffusers, the surfaces 11 and 13 generating the desired, diffusely scattering effect.

While specific embodiments of the invention have been shown and described in detail to illustrate the application of the principles of the invention, it will be understood that the invention may be embodied otherwise without departing from such principles.

The invention claimed is:

1. A detection system for detecting at least one substance in a measurement area, the detection system comprising:
   a receiver; and
   a receiver-side homogenizing device, wherein the homogenizing device is configured to homogenize at least a part of a photon field which exits from the measurement area in a field direction, wherein the homogenizing device comprises a first diffuser and a second diffuser,
   wherein, when viewed in the field direction, the first diffuser is arranged downstream of the measurement area and the second diffuser is arranged downstream of the first diffuser and at a diffuser distance from the first diffuser such that at least a part of the photon field exiting the measurement area passes through both diffusers,
   wherein the first diffuser is configured to homogenize an input photon field falling on the homogenizing device and thereby to generate an intermediate photon field,
   wherein the second diffuser is configured to further homogenize the intermediate photon field and thereby to generate an output photon field, which propagates in the field direction towards the receiver,
   wherein the receiver is arranged downstream of the second diffuser when viewed in the field direction, the receiver is arranged such that at least a part of the homogenized photon field exiting from the measurement area falls on the receiver, and the receiver is configured to generate signals as a function of the incident photon field,
   wherein the homogenizing device comprises an optical element,
   wherein the first diffuser is arranged at the optical element and/or forms a part of the optical element,
   wherein the optical element has a form of a focusing convex lens for bundling the input photon field, and
   wherein the convex lens comprises a convex surface configured to receive the input photon field on an input side of the optical element and to bundle the input photon field in a direction towards the measurement area.

2. A detection system in accordance with claim 1, wherein the position of the homogenizing device relative to the receiver is unchangeable.

3. A detection system in accordance with claim 1, wherein:
   the homogenizing device comprises a jacket surface; and
   the first diffuser, the second diffuser and the jacket surface together enclose an intermediate space, through which the intermediate photon field can pass.

4. A detection system in accordance with claim 3, wherein the homogenizing device is configured such that the intermediate photon field passes through the intermediate space without being diffusely scattered in the intermediate space.

5. A detection system in accordance with claim 3, wherein:
   the jacket surface comprises at least one mirror or is configured as a mirror; and
   the mirror or each mirror of the jacket surface is configured to reflect the intermediate photon field into the intermediate space.

6. A detection system in accordance with claim 1, wherein at least one of the two diffusers is configured as a volume diffuser.

7. A detection system in accordance with claim 1, wherein at least one of the two diffusers is configured as a surface diffuser.

8. A detection system in accordance with claim 1, wherein:
   the first diffuser has a first diffuser surface, which is configured to generate the intermediate photon field from the input photon field by diffuse reflection; and
   the field direction changes depending on the reflection at the first diffuser surface.

9. A detection system in accordance with claim 1, wherein:
   the second diffuser has a second diffuser surface, which is configured to generate the output photon field by diffuse reflection; and
   the field direction changes depending on the reflection at the second diffuser surface.

10. A detection system in accordance with claim 1, wherein:
    the first diffuser is configured to generate the intermediate photon field from the input photon field by transmission; and
    the field direction remains unchanged during this transmission.

11. A detection system in accordance with claim 1, wherein:
    the second diffuser is configured to generate the output photon field from the intermediate photon field by transmission; and the field direction remains unchanged during this transmission.

12. A detection system in accordance with claim 1, wherein:
the first diffuser comprises a planar surface on an output side of the first diffuser;
the output side of the first diffuser faces in a direction of the receiver;
the optical element is located between the measurement area and the first diffuser; and
a spatial distance develops between the optical element and the first diffuser when viewed in the field direction.

13. A detection system in accordance with claim 1, further comprising a transmitter, wherein:
the transmitter is configured to transmit a photon field into the measurement area such that at least a part of the photon field passes through the measurement area and the homogenizing device and falls on the receiver; and
a position of the homogenizing device relative to the transmitter is continuously variable between a predefined minimum distance and a predefined maximum distance.

14. A detection system in accordance with claim 13, wherein:
the transmitter is arranged in a transmitter-side housing;
the homogenizing device and the receiver are arranged together in a receiver-side housing; and
a distance between the transmitter-side housing and the receiver-side housing is continuously variable between the predefined minimum distance and the predefined maximum distance.

15. A detection system for detecting at least one substance in a measurement area, the detection system comprising:
a receiver;
a receiver-side homogenizing device, wherein the homogenizing device is configured to homogenize at least a part of a photon field which exits from the measurement area in a field direction, wherein the homogenizing device comprises a first diffuser and a second diffuser, wherein, when viewed in the field direction, the first diffuser is arranged downstream of the measurement area and the second diffuser is arranged downstream of the first diffuser and at a diffuser distance from the first diffuser such that at least a part of the photon field exiting the measurement area passes through both diffusers, the first diffuser being configured to homogenize an input photon field falling on the homogenizing device and thereby to generate an intermediate photon field, the second diffuser being configured to further homogenize the intermediate photon field and thereby to generate an output photon field, which propagates in the field direction towards the receiver, the receiver being arranged downstream of the second diffuser when viewed in the field direction, the receiver being arranged such that at least a part of the homogenized photon field exiting from the measurement area falls on the receiver, the receiver being configured to generate signals as a function of the incident photon field, the homogenizing device comprising an optical element, wherein the first diffuser is adjacent to the optical element and forms a part of the optical element, the optical element comprising a focusing convex lens, the convex lens comprising a convex surface configured to receive the input photon field on an input side of the optical element and to bundle the input photon field in a direction towards the measurement area.

16. A detection system in accordance with claim 15, wherein:
the first diffuser comprises a planar surface on an output side of the first diffuser;
the output side of the first diffuser faces in a direction of the receiver;
the optical element is located between the measurement area and the first diffuser; and
a spatial distance develops between the optical element and the first diffuser when viewed in the field direction.

17. A detection system in accordance with claim 16, wherein the optical element receives the input photon field directly from the measurement area.

18. A detection system for detecting at least one substance in a measurement area, the detection system comprising:
a receiver;
a receiver-side homogenizing device, wherein the homogenizing device is configured to homogenize at least a part of a photon field which exits from the measurement area in a field direction, wherein the homogenizing device comprises a first diffuser and a second diffuser, wherein, when viewed in the field direction, the first diffuser is arranged downstream of the measurement area and the second diffuser is arranged downstream of the first diffuser and at a diffuser distance from the first diffuser such that at least a part of the photon field exiting the measurement area passes through both diffusers, the first diffuser being configured to homogenize an input photon field falling on the homogenizing device and thereby to generate an intermediate photon field, the second diffuser being configured to further homogenize the intermediate photon field and thereby to generate an output photon field, which propagates in the field direction towards the receiver, the receiver being arranged downstream of the second diffuser when viewed in the field direction, the receiver being arranged such that at least a part of the homogenized photon field exiting from the measurement area falls on the receiver, the receiver being configured to generate signals as a function of the incident photon field, the homogenizing device comprising an optical element, the optical element comprising a focusing convex lens configured to focus the input photon field, the optical element comprising a convex lens, the convex lens comprising a convex surface configured to receive the input photon field and to bundle the input photon field in a direction towards the measurement area, the convex surface being located on an input side of the optical element, wherein one of:
the first diffuser is adjacent to the convex lens; and
the first diffuser forms a part of the convex lens.

19. A detection system in accordance with claim 18, wherein:
the first diffuser comprises a planar surface on an output side of the first diffuser;
the output side of the first diffuser faces in a direction of the receiver;
the optical element is located between the measurement area and the first diffuser; and
a spatial distance develops between the optical element and the first diffuser when viewed in the field direction.

20. A detection system in accordance with claim 19, wherein the optical element receives the input photon field directly from the measurement area.

* * * * *